April 1, 1958
J. J. STEWART
2,829,068
THERMOPLASTIC POLYMERIC FILMS
Filed Nov. 22, 1954
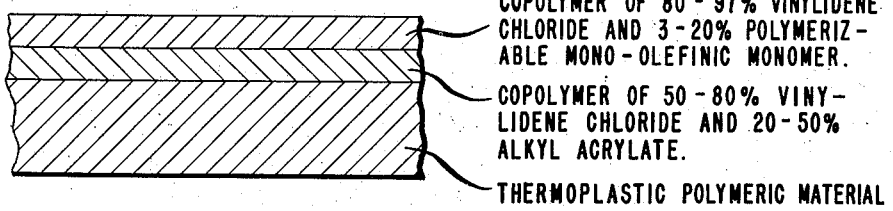
COPOLYMER OF 80 - 97% VINYLIDENE CHLORIDE AND 3 - 20% POLYMERIZABLE MONO - OLEFINIC MONOMER.
COPOLYMER OF 50 - 80% VINYLIDENE CHLORIDE AND 20 - 50% ALKYL ACRYLATE.
THERMOPLASTIC POLYMERIC MATERIAL
INVENTOR
JAY JUNIOR STEWART
BY
ATTORNEY United States Patent Office 2,829,068
Patented Apr. 1, 1958

2,829,068

THERMOPLASTIC POLYMERIC FILMS

Jay Junior Stewart, Wilmington, Del., assignor to E. I. du Pont de Nemours and Company, Wilmington, Del., a corporation of Delaware Application November 22, 1954, Serial No. 470,550

16 Claims. (Cl. 117—76)

This invention relates to the manufacture of thermoplastic polymeric films such as films of polyethylene terephthalate, polyethylene, polystyrene, rubber hydrochloride and polyvinyl chloride. More particularly, it relates to the preparation of polyethylene terephthlate and polyethylene films suitable for conversion to bags, containers and similar packages.

The desired properties for transparent packaging films are well known. They include strength, heat-sealability, durability of the heat-seal as well as durability of the complete film, moistureproofness, low permeability to oxygen and carbon dioxide, high gloss, clarity and freedom from electrostatic charges.

In the case of thermoplastic polymeric materials such as polyethylene terephthalate, strength is obtained by orienting the film in a stretching and/or rolling operation followed by heat-setting the film. Orienting, however, increases the degree of crystallinity and effects other micro-structural changes which tend to impair some of the remaining properties of the film. For example, after orienting polyethylene terephthalate film, it is no longer possible to heat-seal the film with most conventional heat-sealing apparatus and obtain durable bonds. Attempting to heat-seal results in severe shrinkage with attendant puckering and weakness at the seal.

On the other hand, thermoplastic materials such as polyethylene do not require orienting to obtain strength. As unoriented films they possess properties which contribute to their successful utilization in a wide variety of packaging applications. However, polyethylene films lack the requisites for some packaging applications particularly vacuum packaging. Limpness (lack of stiffness) and permeability to such gases as oxygen, carbon dioxide, and organic vapors preclude the use of polyethylene films for vacuum packages.

Recognizing the above major obstacles to wider commercial use of thermoplastic polymeric films such as polyethylene terephthalate and polyethylene, the industry has proposed various remedies. These remedies take the form of coatings or other treatments which tend to improve one property at the expense of another property. However, a thermoplastic polymeric film possessing the optimum requirements for use in a wide variety of commerical packaging applications has remained an elusive goal.

The object of the present invention is to provide a novel thermoplastic polymeric film fulfilling the requirements of a packaging material, i. e. strength, durability, heat-sealability, moistureproofness, low permeability to gases, etc. Another object is to specify a process for preparing the novel thermoplastic polymeric films, particularly films of polyethylene terephthalate and polyethylene. Other objects will appear hereinafter.

The objects are accomplished by providing a base film of thermoplastic polymeric material having at least one surface coated with two special coatings:

(1) A subcoating comprising a copolymer obtained by polymerizing 50–80% vinylidene chloride and 20–50% of an alkyl acrylate wherein the alkyl group contains at least two carbon atoms.

(2) A top coating comprising a copolymer obtained by polymerizing from 80–97% vinylidene chloride and 3–20% of at least one other polymerizable mono-olefinic monomer copolymerizable therewith, preferably an alkyl acrylate.

The accompanying drawing illustrates in a cross-sectional view the novel packaging film of this invention. In the drawing, the base film of thermoplastic polymeric material, the sub-coating of a copolymer of alkyl acrylate and vinylidene chloride, and the top coating of a copolymer of vinylidene chloride and a polymerizable mono-olefinic monomer are identified by legends.

Preferably, the subcoating comprises a copolymer obtained from 50–65% of vinylidene chloride, 35–50% of an alkyl acrylate, and 0.5%–3% by weight, based upon the total weight of the previous two components, of an unsaturated aliphatic acid from the group consisting of acrylic, methacrylic, and itaconic acids, and the top coating comprises a copolymer obtained from 90–97% vinylidene chloride, 3–10% of an alkyl acrylate, and 0.5%–3% by weight, based upon the total weight of the previous two components, of an unsaturated aliphatic acid from the group consisting of acrylic, methacrylic and itaconic acids.

In a specific embodiment of this invention, a base film of polyethylene terephthalate, 0.5 mil thick stretched three times its original dimensions in two directions and heat set at 200° C. while under tension, was coated with the two special coatings. The coatings were applied as dispersions prepared by adding "Duponol" WAQ[1], "Sulframin" AB[2], ammonium persulfate, itaconic acid and water to a vessel fitted with a stirrer and a reflux condenser. After dissolving these components by stirring, vinylidene chloride and the alkyl acrylate were introduced and the mixture refluxed at 35° C. A solution of metasodium bisulfite was added and the mixture stirred until refluxing ceased, thereby indicating completion of polymerization. A quantity of "Duponol," e. g., 7.3 pounds of "Duponol" WAQ for the charge given below or 2.25 pounds of "Sulframin" AB in water may be added subsequent to polymerization to stabilize the copolymer against coagulation.

The subcoating containing a copolymer of 50% vinylidene chloride, 50% 2-ethylhexyl acrylate and 1%, based on the total weight of the previous two components, of itaconic acid was prepared from the following charge:

Water _____ 240 lbs.
"Duponol" WAQ _____ 7.3 lbs.
Ammonium persulfate _____ 152 grams.
Vinylidene chloride _____ 56 lbs.
2-ethylhexyl acrylate _____ 56 lbs.
Itaconic acid _____ 1.12 lbs.
Meta-sodium bisulfite _____ 76 grams in 1.5 lbs. of water.

Added subsequent to polymerization:
"Sulframin" AB _____ 2.25 lbs. in 10 lbs. of water.

The top coat containing a copolymer of 92% vinylidene chloride, 8% methyl acrylate and 1%, based on the

[1] Sodium salt of a fatty alcohol sulfate in aqueous solution (33% active ingredient).
[2] Sodium salt of an alkyl benzene sulfonate.

total weight of the previous two components, of itaconic acid was prepared from the following charge:

| | |
|---|---|
| Water | 120 lbs. |
| "Duponol" WAQ | 10 lbs. |
| Ammonium persulfate | 102 grams. |
| Vinylidene chloride | 138 lbs. |
| Methyl acrylate | 12 lbs. |
| Itaconic acid | 1.5 lbs. |
| Meta-sodium bisulfite | 51 grams in 1.5 lbs. of water. |
| Added subsequent to polymerization: | |
| "Sulframin" AB | 3 lbs. in 10 lbs. of water. |

The polyethylene terephthalate base film was subcoated by passing it through a bath of the first dispersion. Contact time was sufficient to allow the base film to retain a slight excess of the subcoating. The excess was removed by doctoring as the coating was made smooth and brought to the desired thickness. The single-coated film was then dried in an atmosphere maintained at a temperature between 120° C. and 130° C. (It is important that the subcoating is fully coalesced and substantially dry before the top coating is applied.) Then the aqueous dispersion of the top coating was applied, smoothed and dried in a similar manner. The total coating weight of the coated film was 16.7 grams/square meter; 8.9 grams/square meter of the subcoating, 7.8 grams/square meter of the top coating. Its thickness was 0.85 mil.

The resulting film retained its strength, high gloss and clarity. In the following table, the properties of the resulting film are compared to those of uncoated and single-coated films.

TABLE I

| Film | $H_2O$-$O_2$-$N_2$-$CO_2$ permeability (grams/100 sq. meters/hour) | Heat-seal strength (grams/1.5 in.) | Heat-seal durability [1] (falls survived) |
|---|---|---|---|
| Uncoated | 350–4.0–2.0–6.7 | 0 | 0 |
| Single-coated | 35 | 500 | 0–2 |
| Double-coated | 29–1.9–0.8–3.6 | 520 | 9A |

[1] Conditioned at 75° F. and 35% relative humidity.

The durability of the coated film was also measured in this specific embodiment. Bags were fabricated (heat sealed bags 3" wide x 2" gusset x 11" long), and each bag was filled with 800 grams of rice. Fifteen bags were packed into a cardboard case, the packed case weighing about 28 pounds. The case was dropped from a height of 2' at 0° F. and, after 30 drops all the fifteen bags were intact.

The details of the methods for testing the films follow:

Coating weight is determined by immersing a portion of the film in cyclohexanone at room temperature for 15 minutes or longer if necessary to dissolve the coating entirely; rinsing in ethyl acetate; and drying overnight at room temperature and 35% relative humidity. The sample is weighed before and after this treatment to determine the coating weight.

Moisture permeability is determined by placing the test film over the top of an aluminum cup containing 15 milliliters of water, the test area being 33.3 square centimeters. The assembly is weighed accurately and then placed in a dry (less than 3% relative humidity) air-swept oven at 39.5° C. for 24 hours. The assembly is removed from the oven, cooled to room temperature and reweighed. The weight loss is converted to grams of water lost/100 square meters/hour.

Heat-seal strength is measured by cutting a piece of the coated film 4" x 10" with the grain running in the long direction into two pieces 4" x 5". The two pieces are superimposed so that opposite surfaces are in contact. The two pieces of superimposed film are then sealed together at each end at right angles to the grain.

For polyethylene terephthalate, a ¾" wide sealing bar heated to a temperature of 160° C. at 20 p. s. i. pressure contacts the ends for two seconds. (For polyethylene film, the sealing bar is ⅛" wide, at a temperature of 210–230° C. at 10 p. s. i. and a 0.15 second contact time is used.) The sealed sheets are then cut in half at right angles to the grain. From the center of the four resulting pieces, 1½" wide strips parallel to the grain are cut. The four sets of strips are then conditioned for one day at 75° F. and 35% relative humidity. They are tested by opening each set of strips at the free ends, placing them in a Suter testing machine and pulling them apart. The highest force in grams required to pull the strips apart is taken as a measure of the heat-seal bond strength.

Heat-seal durability is measured by an accelerated durability test, the "rice bag drop" test. The rice bags are made by folding a 4" x 15" sheet of the coated film and sealing the film along the two long edges with the bar type heat sealer described previously. After 100 grams of rice are put into the bag, the open end is sealed with the same type of heat sealer. This leaves a small but uniform amount of free space above the rice. The bags represent envelopes of outside dimensions 4" x 6½" and inside dimensions 3" x 5". The bags are conditioned overnight at 75° F. and 35% relative humidity. The test consists of releasing the bag from a fixed clamp which is 2 feet above the floor of a porcelain tray. The bags are held by the end seal and allowed to drop onto the non-sealed bottom edge. The number of falls survived before loss of rice occurs from any type of failure, is taken as a measure of durability. The various letter designations represent the types of failure:

A—seal failure with no film tearing
B—minor film tearing within the heat seal during the course of its rupture
C—more severe film tearing within the heat seal
D—tearing at the edge of the heat seal.

Film durability is evaluated for coated polyethylene film instead of heat-seal durability. The application of polymeric coatings to polyethylene film tends to degrade film durability. On the other hand, the durability of polyethylene terephthalate film is not materially affected by polymeric coatings. The accelerated film durability rating is obtained by folding over a 5" x 12" piece of film and sealing it along two sides with a ¾" strip of a pressure sensitive cellophane tape. This provides a 5" x 6" envelope which is then filled with 400 grams of rice. The envelope is then sealed at the top with the pressure-sensitive tape, leaving a small but uniform amount of free space above the rice. Normally, the longest dimension of the piece of 5" x 12" film runs in the direction in which the film has been extruded. In testing the bag, this length-wise direction of the film is perpendicular to the plane upon which the bag is dropped. The test consists of dropping the bag onto a stone-topped laboratory desk from a fixed height of 18 inches above the desk, i. e., 18 inches from the bottom of the bag to the desk top. The bags are allowed to drop onto the non-sealed (bottom) edge of the bag. The number of falls or drops survived before loss of rice from film failure is recorded; and tests in which the loss of rice resulted from failure of the pressure-sensitive tape are invalidated. Generally, five bags are tested for each film candidate, and the average taken.

Gas permeability is measured by sealing the test film between the high and low pressure side of a split permeability cell (the test area being 39 square centimeters). The test gas is passed through the high pressure side while the low pressure side, to which a manometer is attached, is evacuated to a pressure of approximately 3 millimeters of mercury. At this point the low pressure side is sealed off but the flow of the test gas at one atmosphere is continued through the high pressure side. Diffusion of gas through the test film is then graphically recorded by plotting the rate of fall of the manometer as a function of time. Gas laws are applied to the data so obtained and the gas permeability value is expressed in grams/100 square meters/hour.

Odor penetration is measured in terms of the time required for penetration of odor through pouches of coffee at room temperature. Pouches of coffee are placed within closed jars and the stagnant air around the pouches is sniffed periodically. Odor penetration time is expressed in terms of the numbers of hours to odor perception.

Tables II and III, which follow, summarize the examples of this invention. Table II presents examples employing polyethylene terephthalate as the base film; Table III, polyethylene. Examples 1–6 and 18–20 are outside the scope of the invention and are presented for comparison.

The films were prepared essentially in the manner described previously. The base film, polyethylene terephthalate or polyethylene, was unwound from a roll, passed over a tensioning roll and under a guide roll into a tank containing the coating composition. The coated film was then passed between two "doctor" rolls to smooth the coating and to regulate its thickness. The coated film was dried in a tower maintained at 120° C.–130° C. in the case of coated polyethylene terephthalate and 80° C.–85° C. for polyethylene. The second or top coating was then applied similarly.

The coating compositions were prepared substantially as described for the specific embodiment. The amounts of polymer components were varied to provide the percentages given in the tables.

Before applying the coating compositions to polyethylene film, the base film was pretreated to improve adhesion of the coating compositions to the film. The treatment, as disclosed in copending application Serial No. 323,271 filed November 29, 1952, to L. E. Wolinski, comprises exposing the freshly formed film to ozone at a temperature above 150° C. immediately after extrusion of the film. It is believed that this treatment roughens the surface of the film. When applying the coating compositions to polyethylene film, care must be taken to avoid stretching or elongating the film.

In the examples, the components used for preparing the copolymers are given in weight percentages. The percentages of itaconic acid are based on the total weight of the major components. Thus a copolymer from 70% vinylidene chloride, 30% alkyl acrylate and 2% itaconic acid may be prepared from 70 pounds of vinylidene chloride, 30 pounds of the alkyl acrylate and 2 pounds of itaconic acid.

For convenience, abbreviations have been used in the tables. $VCl_2$ represents vinylidene chloride; 2–EHA, 2-ethylhexyl acrylate; IA, itaconic acid; EA, ethyl acrylate; MA, methyl acrylate; n–OA, normal-octyl acrylate; g., grams; m., meters; *, less than; , greater than; *, approximately.

TABLE II

*Properties of polyethylene terephthalate films*

| Example | Subcoating | | Top coating | | Total coating weight (g./m.²) | $H_2O$–$O_2$–$CO_2$ permeability (g./100 m.²/hr.) | Heat-seal strength (g./1.5 in.) | Heat-seal durability (falls survived) |
|---|---|---|---|---|---|---|---|---|
| | Composition | Weight (g./m.²) | Composition | Weight (g./m.²) | | | | |
| 1 | None | | None | | None | 350–4.0–6.7 | 0 | 0 |
| 2 | do | | 90/10/1–$VCl_2$/EA/IA | 9.6 | 9.6 | 41 | 450 | 0B |
| 3 | do | | 90/10/1–$VCl_2$/EA/IA | 10.4 | 10.4 | 40–1*–1* | 415 | 1B |
| 4 | do | | 90/10/1–$VCl_2$/MA/IA | 14.0 | 14.0 | 30–1*–1* | 690 | 0D |
| 5 | 90/10/1–$VCl_2$/2–EHA/IA | 7.3 | 90/10/1–$VCl_2$/EA/IA | 9.8 | 17.1 | 38 | 515 | 1D |
| 6 | 85/15/1–$VCl_2$/2–EHA/IA | 8.7 | 90/10/1–$VCl_2$/EA/IA | 4.0 | 12.7 | 57 | 435 | 2C |
| 7 | 80/20/1–$VCl_2$/2–EHA/IA | 5.0 | 90/10/1–$VCl_2$/EA/IA | 8.5 | 13.5 | 56 | 570 | 5D |
| 8 | 75/25/1–$VCl_2$/2–EHA/IA | 5.2 | 93/7/1–$VCl_2$/MA/IA | 8.9 | 14.1 | | 695 | 10A |
| 9 | 75/25/1–$VCl_2$/2–EHA/IA | 15.7 | 90/10/1–$VCl_2$/EA/IA | 15.8 | 31.5 | 29 | 1,230 | 11A |
| 10 | 70/30/1–$VCl_2$/2–EHA/IA | 5.3 | 90/10/1–$VCl_2$/EA/IA | 7.7 | 13.0 | 57 | 695 | 4A |
| 11 | 70/30/1–$VCl_2$/2–EHA/IA | 10.6 | 92/8/1–$VCl_2$/MA/IA | 10.1 | 20.7 | | | 8A |
| 12 | 70/30/2–$VCl_2$/2–EHA/IA | 8.1 | 92/8/1–$VCl_2$/MA/IA | 12.1 | 20.2 | 20–0.5–0.8 | 920 | 9A |
| 13 | 60/40/1–$VCl_2$/2–EHA/IA | 4.6 | 90/10/1–$VCl_2$/EA/IA | 19.8 | 24.4 | 38 | 1,055 | 11A |
| 14 | 70/30/1–$VCl_2$/n–OA/IA | 11.3 | 90/10/1–$VCl_2$/EA/IA | 17.0 | 28.3 | 34 | 1,335 | 16A |
| 15 | 60/40/1–$VCl_2$/EA/IA | 6.6 | 90/10/1–$VCl_2$/EA/IA | 6.0 | 12.6 | 68 | 555 | 4D |
| 16 | 50/50/1–$VCl_2$/EA/IA | 4.2 | 90/10/1–$VCl_2$/EA/IA | 8.1 | 12.3 | 69 | 780 | 4A |
| 17 | 50/50/1–$VCl_2$/EA/IA | 5.2 | 92/8/1–$VCl_2$/MA/IA | 14.5 | 19.7 | 19 | 805 | 3A |

TABLE III

*Properties of polyethylene films*

| Example | Subcoating | | Top coating | | Total coating weight (g./m.²) | $H_2O$–$O_2$–$CO_2$ permeability (g./100 m.²/hr.) | Heat-seal strength (g./1.5 in.) | Film durability (falls survived) |
|---|---|---|---|---|---|---|---|---|
| | Composition | Weight (g./m.²) | Composition | Weight (g./m.²) | | | | |
| 18 | None | | None | | None | 70–12–15 | 1,500 | 50** |
| 19 | do | | 94/6/2–$VCl_2$/MA/IA | 8 | 8 | 40–1*–1* | 450 | 2 |
| 20 | 90/10/1–$VCl_2$/2–EHA/IA | 7.7 | 94/6/2–$VCl_2$/MA/IA | 5.1 | 12.8 | | 562 | 1* |
| 21 | 70/30/2–$VCl_2$/2–EHA/IA | 5 | 94/6/2–$VCl_2$/MA/IA | 7 | 12 | 40–1*–1* | 600 | 20 |
| 22 | 70/30/2–$VCl_2$/2–EHA/IA | 17 | 94/6/2–$VCl_2$/MA/IA | 3 | 20 | 40–1*–1* | 1,050 | 50** |
| 23 | 70/30/2–$VCl_2$/2–EHA/IA | 8 | 92/8/2–$VCl_2$/MA/IA | 6 | 14 | 35–2–3 | 750 | 40 |
| 24 | 70/30/2–$VCl_2$/2–EHA/IA | 17.1 | 94/6/2–$VCl_2$/MA/IA | 3.7 | 20.8 | 60***–1*–1* | 743 | 50** |
| 25 | 60/40/2–$VCl_2$/2–EHA/IA | 6.5 | 94/6/2–$VCl_2$/MA/IA | 2.0 | 8.5 | | 585 | 45** |
| 26 | 50/50/1–$VCl_2$/2–EHA/IA | 11.7 | 94/6/2–$VCl_2$/MA/IA | 3.0 | 14.7 | | 412 | 22*** |
| 27 | 70/30/1–$VCl_2$/n–OA/IA | 10 | 94/6/2–$VCl_2$/MA/IA | 5 | 15 | | 585 | 33** |

Grease penetration data (time required for penetration of olive oil through pouches at the stated temperature):
    Example 18—Penetration noted in 3 days at 40° C.
    Example 21—No penetration noted after 6 days at 40° C.
    Example 22—No penetration noted after 6 days at 55° C.
Odor penetration data (time required for penetration of odor through pouches of coffee at room temperature; pouches placed within closed jars):
    Example 18—Strong odor in 3 days.
    Example 22—No odor after 31 days.

While the examples refer to coating polyethylene terephthalate and polyethylene films, the invention is applicable to thermoplastic polymeric films in general. The invention is applicable to these films whether the films are stretched and heat-set, stretched only or neither stretched nor heat-set.

A particularly useful application of the invention is found in using polyethylene terephthalate which has been stretched and/or rolled but not heat-set. This twice-coated polyethylene terephthalate film stretched three times its original dimensions in two directions, is outstanding as a heat-shrinkable tight wrapping for such articles as frozen poultry, ham, smoked meats, etc. The coated heat-shrinkable film is normally formed into a bag open at one end; the article of food is placed into the bag; and the bag is sealed. Air may be evacuated from the bag before sealing if desired. The bag containing the article of food is then immersed into a hot liquid, e. g., water at 70°–100° C., to shrink the bag around the article.

The coatings may also be applied to unstretched films which may then be stretched in one or two directions (as described in U. S. Patent 2,627,088 to Alles and Saner). This procedure also produces a coated, heat-shrinkable wrapping film which may be used directly in sheet form or fabricated into bags.

The important concept leading to the wrapping materials described in the examples and the materials described in the preceding paragraphs resides in the use of a base film of thermoplastic polymeric material coated with two critical coatings, namely; a subcoating comprising a copolymer obtained from 50–80% by weight of vinylidene chloride and 20–50% by weight of an alkyl acrylate, wherein the alkyl group contains at least 2 carbon atoms, and a top coating comprising a copolymer obtained from 80–90% vinylidene chloride and 3–20% of at least one other polymerizable mono-olefinic monomer copolymerizable with vinylidene chloride.

The alkyl acrylate in the subcoating contributes to the elasticity of the subcoating. The amount of this component necessary to provide a packaging material of satisfactory strength and durability is dependent upon the particular alkyl acrylate used. For example, the lower alkyl acrylates such as ethyl acrylate provide satisfactory elasticity when about 50% is used in the copolymer. For the higher alkyl acrylates such as 2-ethylhexyl acrylate, 25–50% provides a satisfactory elastic copolymer.

The moisture impermeability of the film of this invention is contributed by the top coating composition. A hard polymer prepared from at least 80% vinylidene chloride and 3–20% of at least one other polymerizable monoolefinic monomer is necessary. As polymerizable monomers for use with the vinylidene chloride in the top coating, I have illustrated the use of alkyl acrylates. However, the invention is not limited to these. Other polymerizable monomers may also be used. The list includes: methyl, ethyl, isobutyl, butyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methypropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U. S. Patent 2,160,943. These compounds may be described as vinyl or vinylidene compounds having a single "$CH_2=C<$" group. The most useful ones fall within the general formula

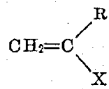

where R may be hydrogen, a halogen or a saturated aliphatic radical and X is selected from one of the following groups: —Cl, —Br, —F, —CN, —$C_6H_5$, —COOH,

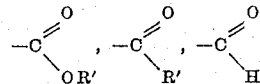

—$OC_6H_5$, —$CONH_2$, —CONH—R′, and —$CONR_2'$, in which R′ is alkyl.

The coating may be applied from aqueous or organic vehicles, i. e., in the form of aqueous dispersions or from solutions of the polymers in organic solvents. For optimum properties, unsaturated aliphatic acids such as itaconic acid, acrylic acid and methacrylic acid may be incorporated in the coating compositions. While the examples illustrate the use of itaconic acid in the coating compositions, substantially equivalent quantities of either acrylic acid or methacrylic acid used in place of itaconic acid produce similar results. When the compositions are applied from organic solutions, the acid may be omitted with little deleterious effect. When coating from aqueous dispersions, the acid may also be omitted if steps are taken to facilitate wetting of the film by using commercial wetting agents or other methods. It should be pointed out that films coated with compositions that do not include the unsaturated aliphatic acids are somewhat inferior in the degree of transparency. For this reason, it is preferred to include one of the above unsaturated aliphatic acids in both the sub- and top coating compositions.

The coatings may be applied in accordance with any known coating techniques. They may be applied by passing the film through baths in a continuous manner or in a batch manner. Coatings may also be sprayed on the film, or applied manually by brushing or the like. The thickness of the coatings may be adjusted in accordance with methods well known in the coating art. Selection of the proper thicknesses of the top coating and the subcoating depends to some extent on the properties that one desires to emphasize. Thus, the thickness of the subcoating influences the strength and durability of the heat-seal and the durability of the film in general. The thickness of the top coating influences the permeability of the film to moisture and gases.

The double-coated films of this invention are useful as packaging materials for foods, cigarettes and the like. Their durability and their impermeability to gases and water vapor combine to provide wrapping materials that can withstand the abuse of handling and shipping and wherein the freshness of the products may be retained over long periods. A particularly useful application of the improved double-coated polyethylene terephthalate film is in refrigerating units. Polyethylene terephthalate film, being impervious to halogen-substituted hydrocarbon gases such as dichlorodifluoromethane, can be used in the units wherever insulation from these gases is necessary.

While the invention contemplates the use of the copolymers as the essential constituents of the coatings, other ingredients may be added. The addition of pigments, dyes, delustrants, plasticizers, etc., is therefore understood to be within the purview of this invention.

As many widely different embodiments may be made without departing from the spirit and scope of this invention, it is understood that the invention is not limited except as defined in the appended claims.

What is claimed is:

1. A packaging film comprising base film of thermoplastic polymeric material having at least one surface coated with a subcoating comprising a copolymer obtained from 50–80% vinylidene chloride and 20–50% alkyl acrylate wherein the alkyl group contains at least two carbon atoms, and a top coating comprising a copolymer obtained from 80–97% vinylidene chloride and 3–20% of at least one other polymerizable mono-olefinic monomer copolymerizable therewith.

2. A packaging film comprising base film of thermoplastic polymeric material having at least one surface coated with a subcoating comprising a copolymer obtained from 50–65% vinylidene chloride and 35–50% of an alkyl acrylate wherein the alkyl group contains at least two carbon atoms, and a top coating comprising a copolymer obtained from 90–97% vinylidene chloride and 3–10% of at least one other polymerizable mono-olefinic monomer copolymerizable therewith.

3. A packaging film comprising base film of thermoplastic polymeric material having at least one surface coated with a subcoating comprising a copolymer obtained from 50–80% vinylidene chloride, 20–50% alkyl acrylate wherein the alkyl group contains at least two carbon atoms and 0.5–3%, based on the total weight of the previous components, of an unsaturated aliphatic acid from the group consisting of acrylic acid, methacrylic acid and itaconic acid and a top coating comprising a copolymer obtained from 80–97% vinylidene chloride, 3–20% alkyl acrylate and 0.5–3%, based on the total weight of the previous components, of an unsaturated aliphatic acid from the group consisting of acrylic acid, methacrylic acid and itaconic acid.

4. A packaging film comprising base film of polyethylene terephthalate having at least one surface coated with a subcoating comprising a copolymer obtained from 50–80% vinylidene chloride, 20–50% alkyl acrylate wherein the alkyl group contains at least two carbon atoms and 0.5–3%, based on the total weight of the previous components, of an unsaturated aliphatic acid from the group consisting of acrylic acid, methacrylic acid and itaconic acid and a top coating comprising a copolymer obtained from 80–97% vinylidene chloride, 3–20% alkyl acrylate and 0.5–3%, based on the total weight of the previous components, of an unsaturated aliphatic acid from the group consisting of acrylic acid, methacrylic acid and itaconic acid.

5. A packaging film comprising base film of polyethylene having at least one surface coated with a subcoating comprising a copolymer obtained from 50–80% vinylidene chloride, 20–50% alkyl acrylate wherein the alkyl group contains at least two carbon atoms and 0.5–3%, based on the total weight of the previous components, of an unsaturated aliphatic acid from the group consisting of acrylic acid, methacrylic acid, and itaconic acid and a top coating comprising a copolymer obtained from 80–97% vinylidene chloride, 3–20% alkyl acrylate and 0.5–3%, based on the total weight of the previous components, of an unsaturated aliphatic acid from the group consisting of acrylic acid, methacrylic acid, and itaconic acid.

6. A film as in claim 3 wherein the alkyl acrylate in the top coating is methyl acrylate.

7. A film as in claim 3 wherein the alkyl acrylate in the top coating is ethyl acrylate.

8. A film as in claim 1 wherein the alkyl acrylate in the subcoating is 2-ethylhexyl acrylate.

9. A film as in claim 1 wherein the alkyl acrylate in the subcoating is ethyl acrylate.

10. A film as in claim 1 wherein the alkyl acrylate in the subcoating is n-octyl acrylate.

11. A film as in claim 3 wherein the unsaturated aliphatic acid in the coatings is itaconic acid.

12. A process for preparing a packaging film which comprises coating a base film of thermoplastic polymeric material with a copolymer obtained from 50–80% vinylidene chloride, 20–50% alkyl acrylate wherein the alkyl group contains at least two carbon atoms and 0.5–3%, based on the total weight of the previous components, of itaconic acid; drying the coated base film; applying to the dried coated film a second coating comprising a copolymer obtained from 80–97% vinylidene chloride, 3–20% alkyl acrylate and 0.5–3%, based on the total weight of the previous components, of itaconic acid; and drying the twice-coated film.

13. A process for preparing a packaging film which comprises coating oriented polyethylene terephthalate film with a copolymer obtained from 50% vinylidene chloride, 50% 2-ethylhexyl acrylate and 1%, based on the weight of vinylidene chloride plus 2-ethylhexyl acrylate, of itaconic acid; drying the coated film; applying to the dried coated film a second coating comprising a copolymer obtained from 92% vinylidene chloride, 8% methyl acrylate and 1%, based on the weight of vinylidene chloride and methyl acrylate, of itaconic acid; and drying the twice-coated film.

14. A process for preparing a packaging film which comprises coating a base film of thermoplastic polymeric material with copolymers obtained from 50–80% vinylidene chloride and 20–50% alkyl acrylate wherein the alkyl group contains at least two carbon atoms in a suitable medium; drying the coated base film; applying to the dried coated film a second coating comprising a copolymer obtained from 80–97% vinylidene chloride and 3–20% of at least one other polymerizable mono-olefinic monomer copolymerizable with vinylidene chloride in a suitable medium; and drying the twice coated film.

15. A process as in claim 14 wherein the thermoplastic polymeric material is polyethylene terephthalate.

16. A process as in claim 14 wherein the thermoplastic polymeric material is polyethylene.

References Cited in the file of this patent

UNITED STATES PATENTS 2,627,088    Alles et al.    Feb. 3, 1953

FOREIGN PATENTS 500,178    Canada    Feb. 23, 1954

UNITED STATES PATENT OFFICE
CERTIFICATE OF CORRECTION

Patent No. 2,829,068                                       April 1, 1958

Jay Junior Stewart

It is hereby certified that error appears in the printed specification of the above numbered patent requiring correction and that the said Letters Patent should read as corrected below.

Column 5, Table III, second column thereof, Example 21, for "70/30/2-VC1/2-EHA/IA" read -- 70/30/2-VCl$_2$/2-EHA/IA --; column 7, line 36 for "80-90%" read -- 80-97% --; column 8, line 19, for "coating" read -- coatings --; column 9, lines 2, 11, 20, 34 and 48, before "base", each occurrence, insert -- a --.

Signed and sealed this 23rd day of September 1958.

(SEAL)
Attest:

KARL H. AXLINE                                                  ROBERT C. WATSON

Attesting Officer                                          Commissioner of Patents